US012525711B1

(12) United States Patent
Paulus et al.

(10) Patent No.: US 12,525,711 B1
(45) Date of Patent: Jan. 13, 2026

(54) ANTENNAS WITH BALUNS FOR TRANSMITTING AND RECEIVING SCALAR LONGITUDINAL WAVES, AND METHODS OF USE

(71) Applicant: The United States of America as represented by the Secretary of the Navy, Keyport, WA (US)

(72) Inventors: Mark E Paulus, Poulsbo, WA (US); Daniel A Gentile, Keyport, WA (US)

(73) Assignee: The United States of America as represented by the Secretary of the Navy, Keyport, WA (US)

( * ) Notice: Subject to any disclaimer, the term of this patent is extended or adjusted under 35 U.S.C. 154(b) by 59 days.

(21) Appl. No.: 18/632,257

(22) Filed: Apr. 10, 2024

Related U.S. Application Data

(60) Provisional application No. 63/458,437, filed on Apr. 10, 2023.

(51) Int. Cl.
*H01Q 1/50* (2006.01)
*H01Q 9/30* (2006.01)

(52) U.S. Cl.
CPC ................. *H01Q 1/50* (2013.01); *H01Q 9/30* (2013.01)

(58) Field of Classification Search
CPC .................................. H01Q 1/50; H01Q 9/30
See application file for complete search history.

(56) References Cited

U.S. PATENT DOCUMENTS

| | | | | |
|---|---|---|---|---|
| 5,387,919 | A | 2/1995 | Lam | |
| 9,306,527 | B1 | 4/2016 | Hively | |
| 9,812,754 | B2 | 11/2017 | Parsche | |
| 11,088,454 | B2 | 8/2021 | Aliakbarian | |
| 2016/0254584 | A1* | 9/2016 | Parsche .................... | H01Q 1/50 343/859 |
| 2019/0393608 | A1* | 12/2019 | Aliakbarian ............. | H01Q 5/50 |

OTHER PUBLICATIONS

Barnesville-Lamar County Industrial Development Authority, Sleeve Baluns, W8JI.com website managed by amateur radio members for the 147.225 Barnesville repeater tower with call sign W8JI, https://w8ji.com/sleeve_baluns.htm, 2010, pp. 1-5, WordPress, Barnesville, Georgia, United States of America.

(Continued)

*Primary Examiner* — David E Lotter
(74) *Attorney, Agent, or Firm* — Stephen J. Leahu; Naval Undersea Warfare Center, Keyport

(57) ABSTRACT

Devices, systems and methods are provided for the transmission of scalar longitudinal waves via a monopole antenna. A balun may attach to a shield at a base end of a monopole antenna to form a cylindrical shell shape with a closed end at the contact location and an open end facing the tip end of the monopole antenna. The open end may form an aperture between a distal shield end and a distal balun end, and the lengths of the shield and balun may be equal. A shielded portion and an antenna portion of the center conductor may be encased by a spherical transmitter. The center conductor may extend through the aperture, toward the tip end, and through a gap formed between the terminating end of the shield at the distal end of the shielded portion and the first end of the antenna portion encased by an antenna tube.

36 Claims, 7 Drawing Sheets

(56) References Cited

OTHER PUBLICATIONS

Leslee Kulba, Evidence of Scalar Longitudinal Waves, Electric Space Craft, issue 36, pp. 12-14,Aug. 5, 2003, Leicester, North Carolina, United States of America.
L. Hively and A.S. Loebi, Classical and extended electrodynamics, Physics Essays Publication, vol. 32, issue 1, pp. 112-126, Feb. 25, 2019 ResearchGate, Berlin, Germany.
Bruce A. Eggers, An Analysis of the Balun, QST, Apr. 1980, pp. 19-21, ARRL The National Association for Amateur Radio, Newington, Connecticut, United States of America.
DT-ACO, Scalar Waves, CIA-RDP96-00792800050024000l-6, Mar. 7, 2001, pp. 1-3, Central Intelligence Agency (CIA) Langley, McLean, Virginia, United States of America.

* cited by examiner

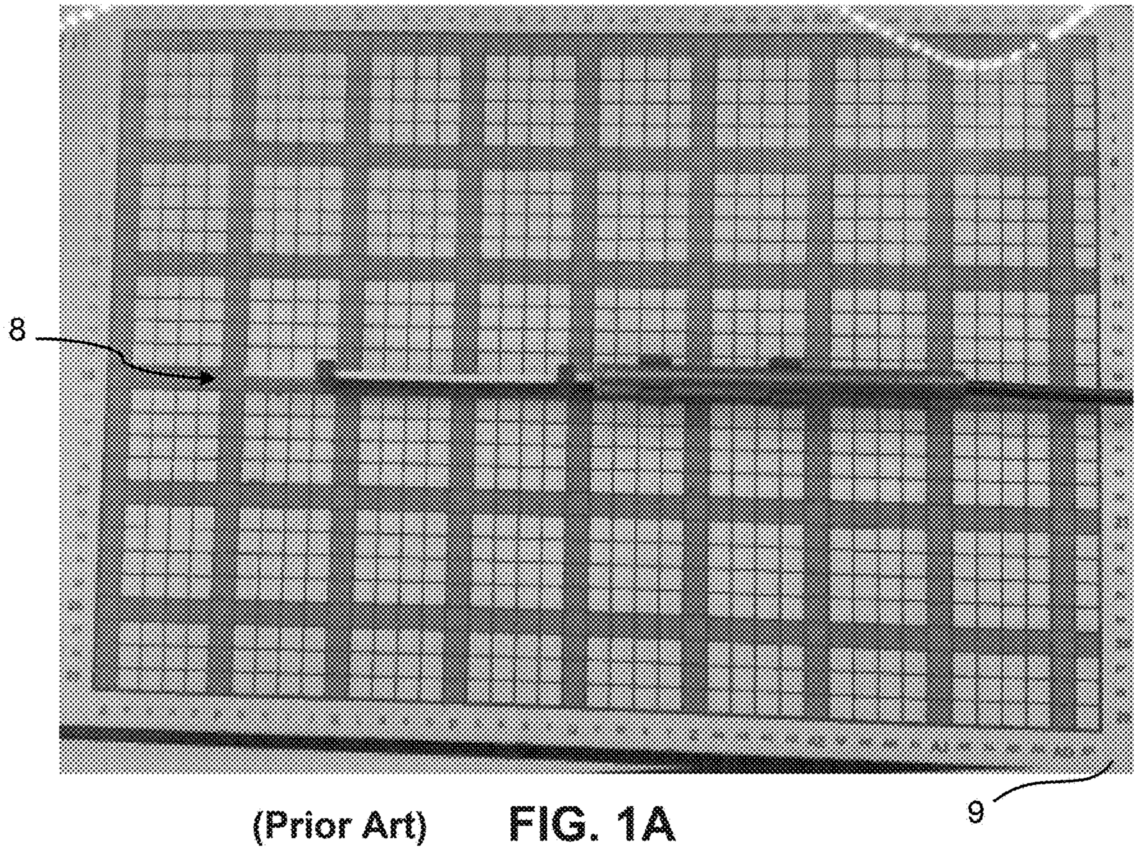
(Prior Art) FIG. 1A
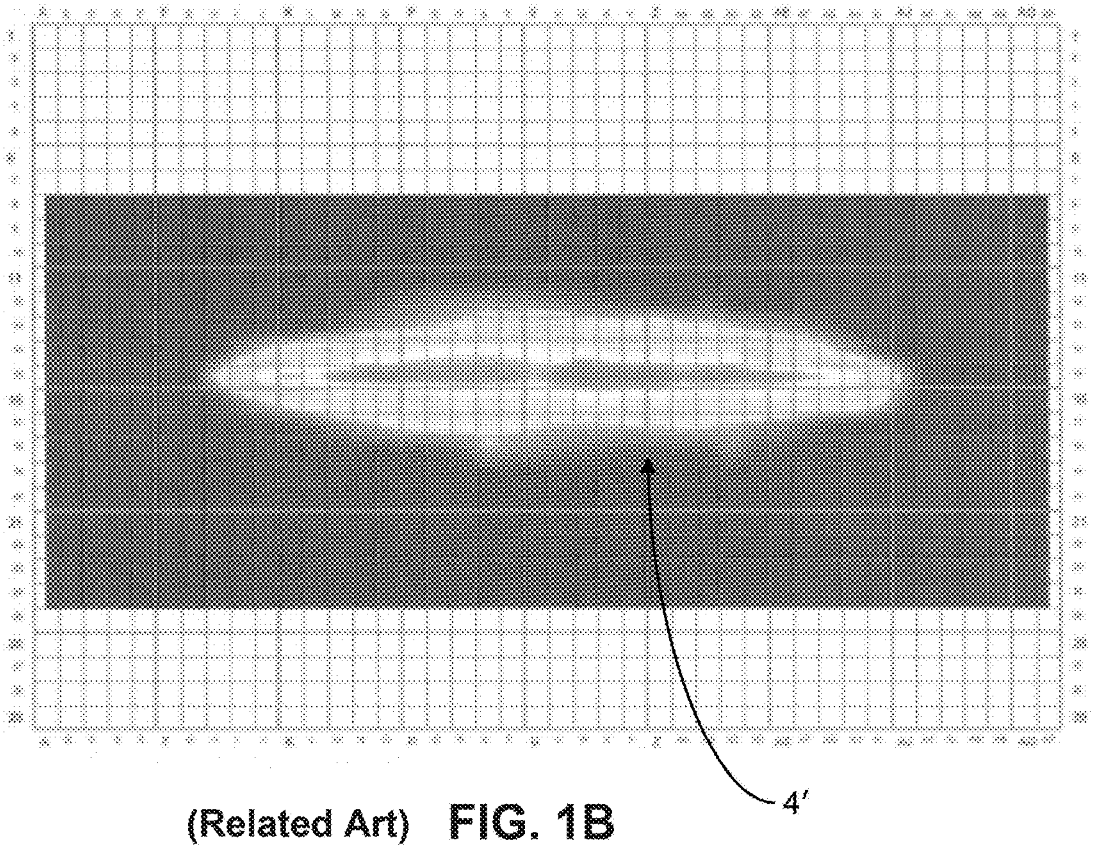
(Related Art) FIG. 1B

FIG. 5A
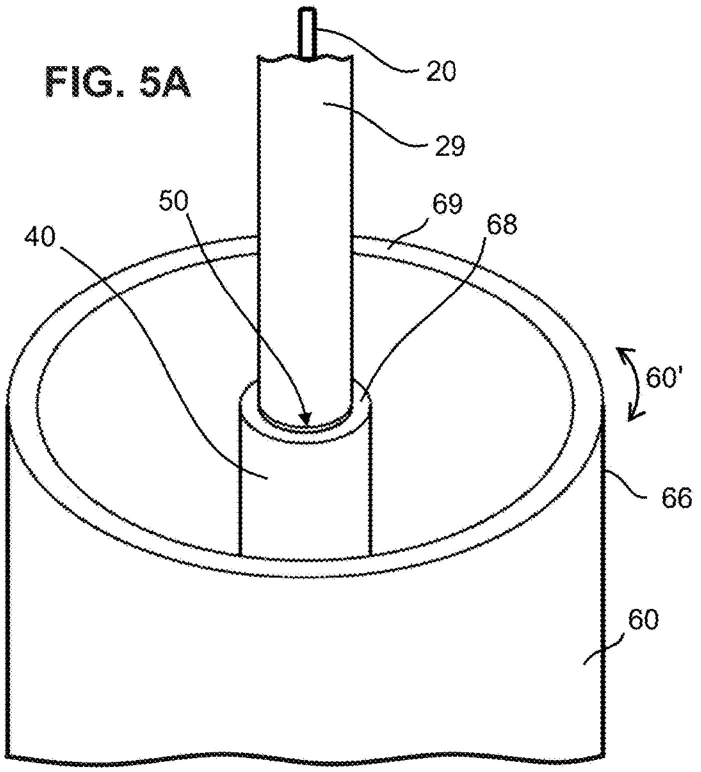
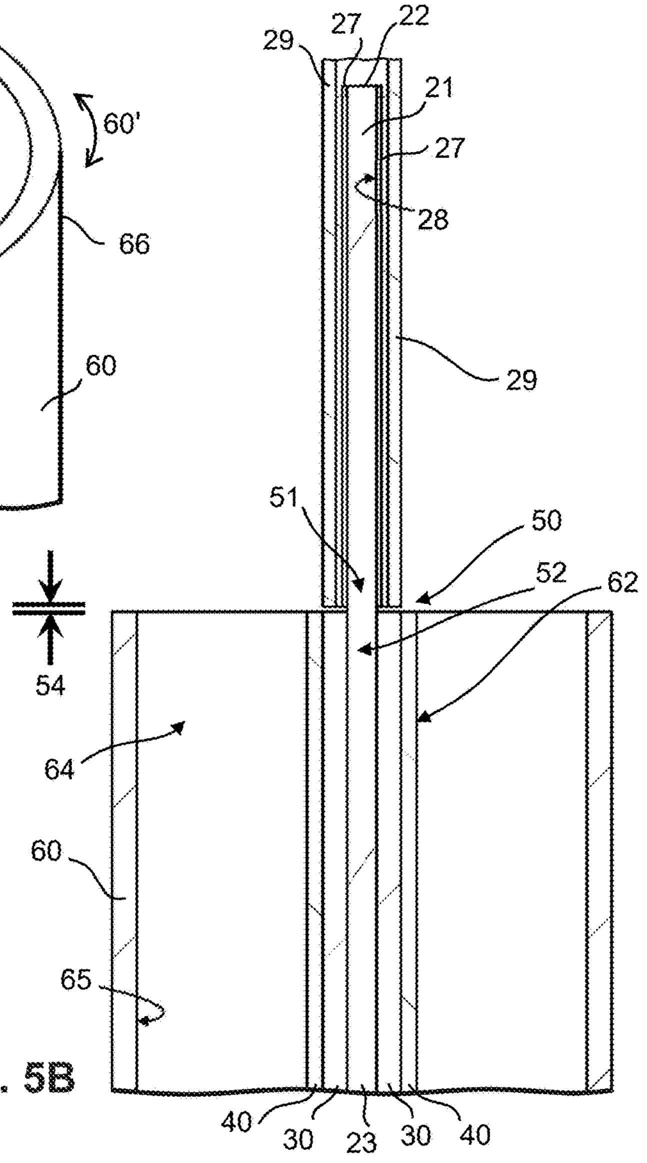
FIG. 5B

ANTENNAS WITH BALUNS FOR TRANSMITTING AND RECEIVING SCALAR LONGITUDINAL WAVES, AND METHODS OF USE

STATEMENT OF GOVERNMENT INTEREST

The embodiments of the present disclosure may be manufactured and used by or for the Government of the United States of America for governmental purposes without the payment of any royalties thereon or therefor.

FIELD OF THE DISCLOSURE

The present disclosure relates in general to the fields of antennas and scalar waves, and in particular to systems and methods and apparatuses for transmitting and receiving scalar longitudinal waves using monopole antennas with skirt baluns.

BACKGROUND

Basic techniques for the generation of scalar waves are known in the art. Past antenna systems typically utilized Maxwell's classic electrodynamic equations with routine terms to solve for scalar longitudinal waves (SLWs), as described in U.S. Pat. No. 9,306,527. The theoretical assertions and the classical electrodynamic models and equations, as well as the transmitters and the conducting wires and the coaxial cable for the antenna, described in the aforementioned patent are incorporated herein by reference. Improved solutions are desired for radiating SLWs. Features of the present disclosure overcome various deficiencies of the prior art by providing a method, system and apparatus having advantages that will become apparent from the following disclosure.

BRIEF SUMMARY OF THE DISCLOSURE

The following presents a simplified summary of the disclosure in order to provide a basic understanding of some aspects of the disclosure. This summary is not an extensive overview of the disclosure. It is intended neither to identify key or critical elements of the disclosure, nor to delineate the scope of the disclosure. Its sole purpose is to present some concepts, in accordance with the disclosure, in a simplified form as a prelude to the more detailed description presented herein.

In accordance with certain embodiments of the disclosed apparatuses, systems and methods, a balun may be attached to a shield at a base end of a monopole antenna to form a cylindrical shell shape with a closed end located at the contact location and an open end facing the tip end of the monopole antenna. The open end may form an aperture between a distal shield end and a distal balun end, and the lengths of the shield and balun may be equal. The cylindrical shell diameter may be equivalent to a half of a wavelength. In some embodiments, a shielded portion and an antenna portion of the center conductor may be encased by a spherical transmitter. In an embodiment, a center conductor may extend through the aperture, toward the tip end, and through a gap formed between the terminating end of the shield at the distal end of the shielded portion and the first end of the antenna portion encased by an antenna tube. According to technical advantages for some embodiments, the presently disclosed balun-attached antenna may enable the generation and transmission of SLWs. Further advantages and features of the present disclosure are illustrated in the drawings and described in detail below.

BRIEF DESCRIPTION OF THE DRAWINGS

The foregoing and other objects, features, and advantages for embodiments of the present disclosure will be apparent from the following more particular description of the embodiments as illustrated in the accompanying drawings, in which reference characters refer to the same parts throughout the various views. The drawings are not necessarily to scale, emphasis instead being placed upon illustrating principles of the present disclosure.

FIG. 1A is a photograph of a balun attached to a dipole antenna, in accordance with past techniques, with an E-Field scanner grid shown beneath the balun-attached antenna.

FIG. 1B is a graphical representation rendered via a display monitor that illustrates an E-Field scanner image showing the radiation of electromagnetic waves detected from the balun portion of the dipole antenna depicted in FIG. 1A.

FIGS. 5A-5B illustrate prospective and sectional views of portions of the monopole antenna depicted in FIG. 3A, including a distal shield end of a shield and a distal balun end of the balun, in accordance with certain embodiments of the present disclosure.

DETAILED DESCRIPTION OF THE DISCLOSURE

Reference will now be made in detail to the embodiments of the present disclosure, examples of which are illustrated in the accompanying drawings. The present disclosure may be embodied in various forms, including a system, a method, or a device for transmitting and receiving SLWs.

Pursuant to prior techniques, a balun is routinely used with an antenna to avoid feed line radiation by attaching the balun to an antenna to prevent the coaxial cable from acting as an antenna and radiating power. Accordingly, the balun is a 'balanced line to unbalanced line' device that transforms a balanced transmission line to an unbalanced transmission line in order to help the electricity run smoothly from the ground to the antenna. As illustrated in FIG. 2 of U.S. Pat. No. 9,306,527 referenced above, which is a cross-sectional view of constant electric field magnitude contours for an antenna with a skirt balun, electromagnetic waves radiate from the balun portion of such antennas. The description of FIG. 2 of the aforementioned patent is incorporated herein by reference. That patent states that a skirt balun may be disposed at an end of the second conductor from which the first conductor extends, such that the first conductor is configured to operate as a linear antenna. The point of attachment for the balun, as described in the referenced patent and in accordance with the routine practices of the prior techniques known in the art, is the antenna feed point located at the proximate end of the antenna. FIG. 1A shows an antenna 8 arranged in the manner explained in the patent referenced above, and FIG. 1B illustrates the radiation 4' of electromagnetic waves detected from the balun portion of such an antenna 8.

Figure 2A:
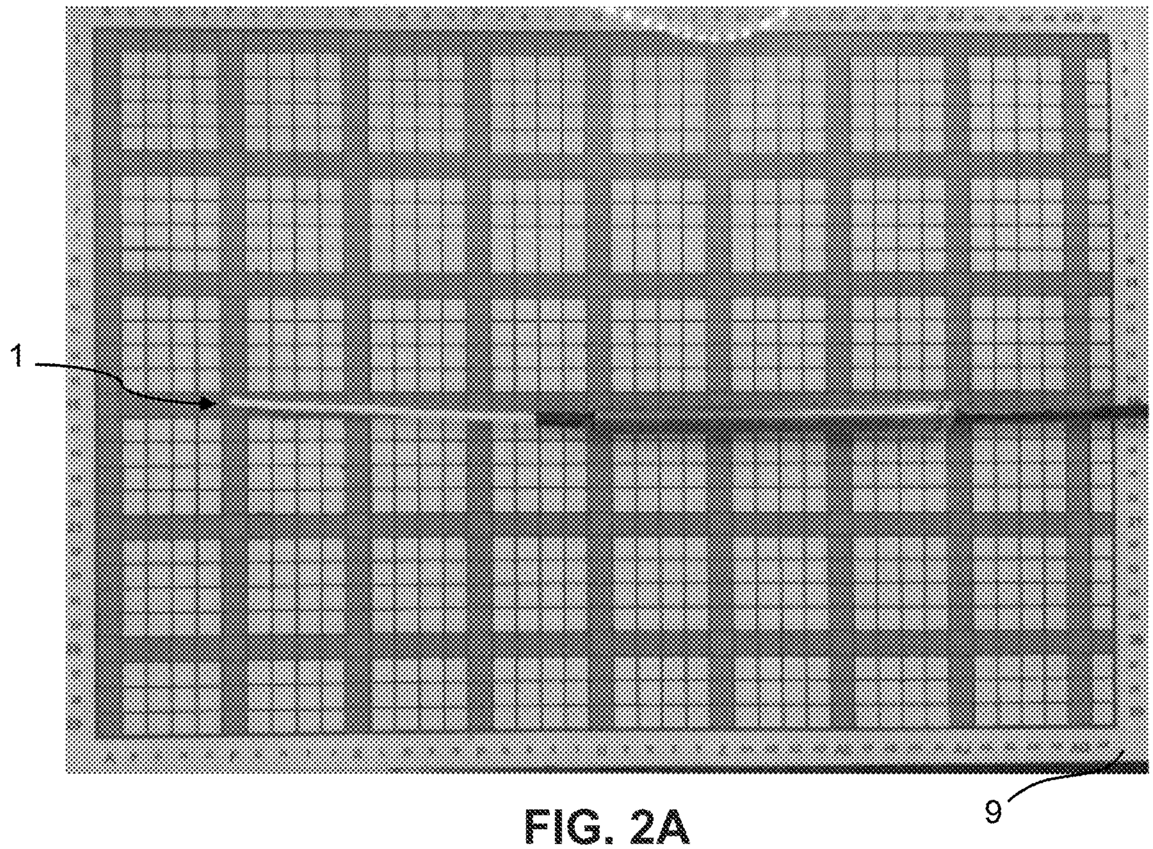
FIG. 2A is a photograph of a balun attached to a base end of a monopole antenna, in accordance with certain embodiments of the present disclosure, with an E-Field scanner grid shown beneath the balun-attached antenna.
Figure 2B:
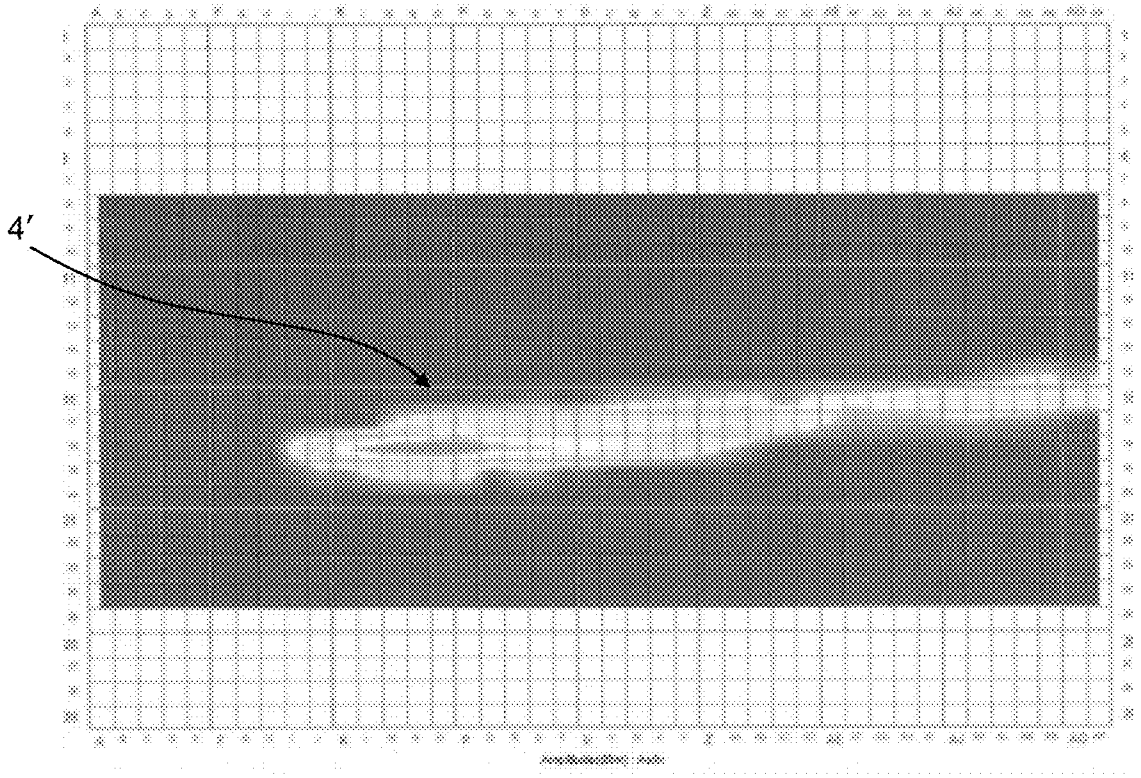
FIG. 2B is a graphical representation rendered via a display monitor that illustrates an E-Field scanner image showing the radiation of electromagnetic waves detected from the antenna portion of the monopole antenna depicted in FIG. 2A, in accordance with certain embodiments of the present disclosure.
Figure 3A:
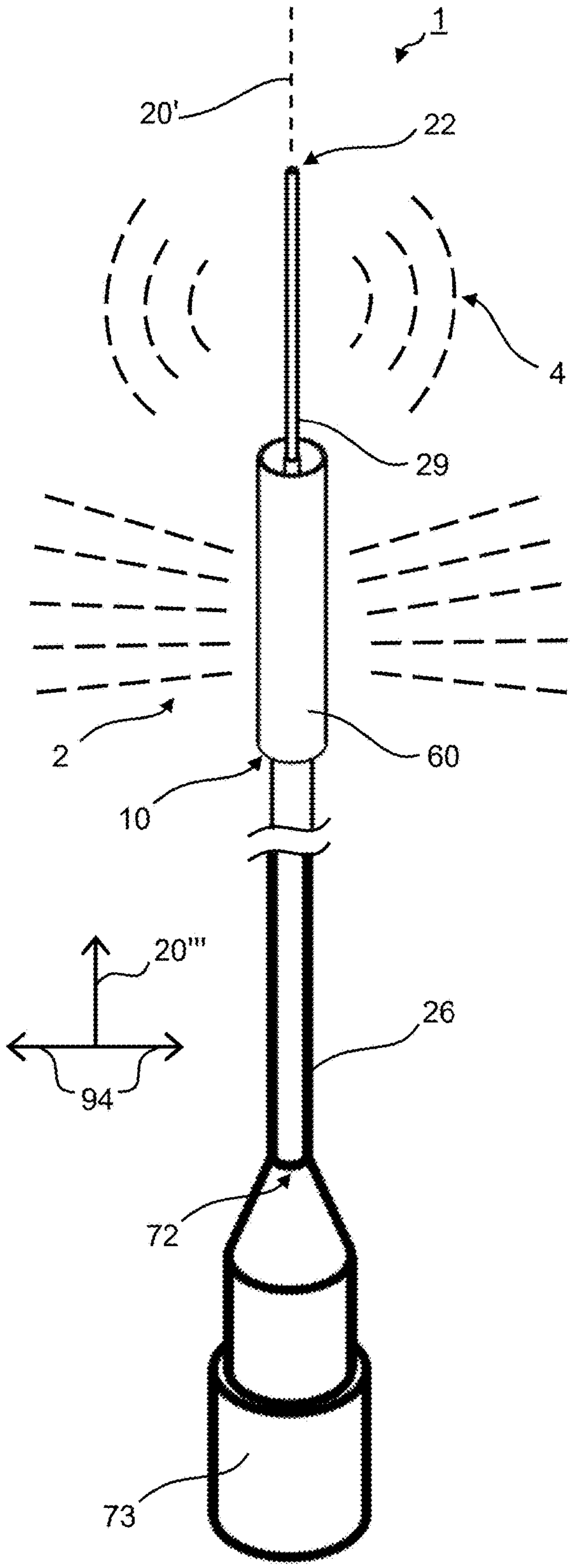
FIG. 3A illustrates a prospective view of an example of a monopole antenna, in accordance with certain embodiments of the present disclosure.
Figure 3B:
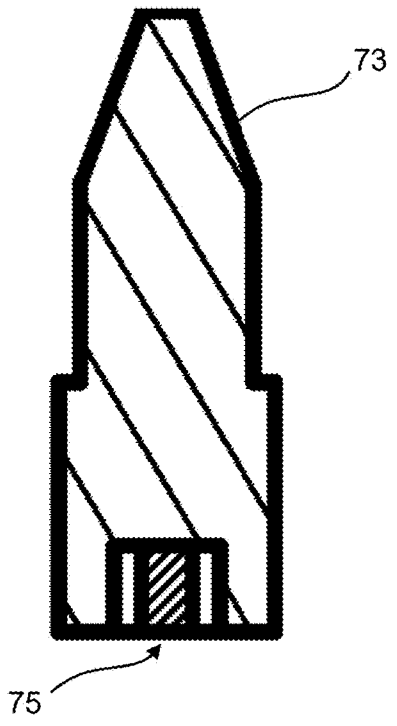
FIG. 3B illustrates sectional view of an example of a cable connector for the monopole antenna depicted in FIG. 3A, in accordance with certain embodiments of the present disclosure.
Figure 4A:
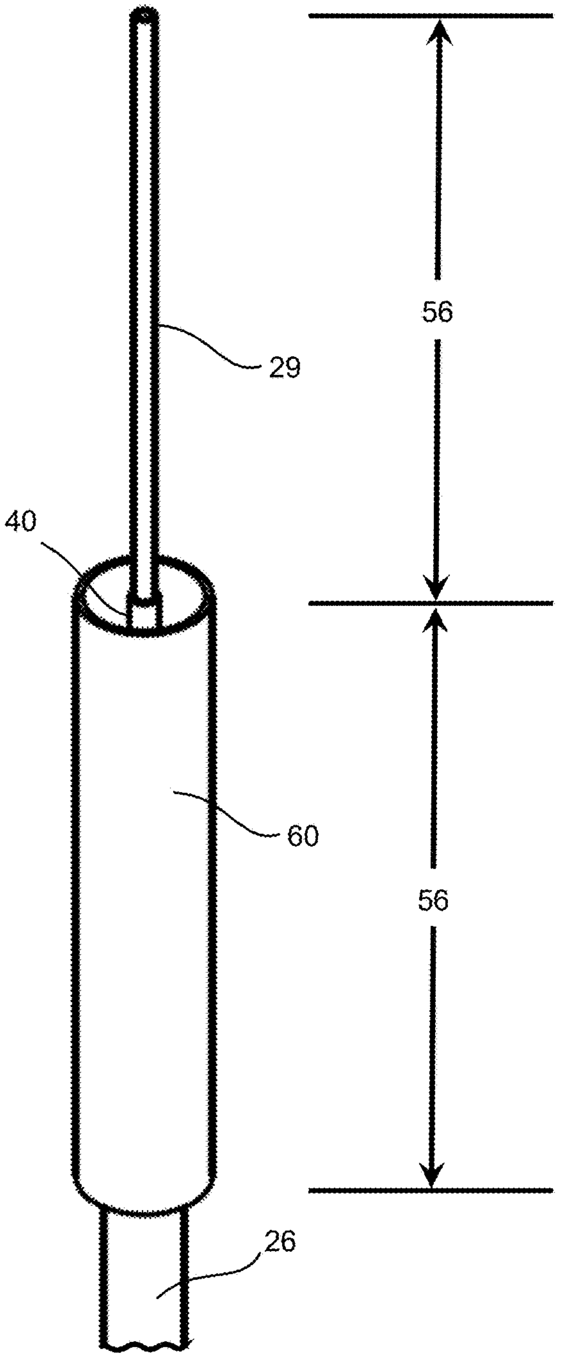
FIGS. 4A-4B illustrate prospective and sectional views of portions of the monopole antenna depicted in FIG. 3A, including an antenna portion, a shielded portion and cable portion, in accordance with certain embodiments of the present disclosure.
Figure 4B:
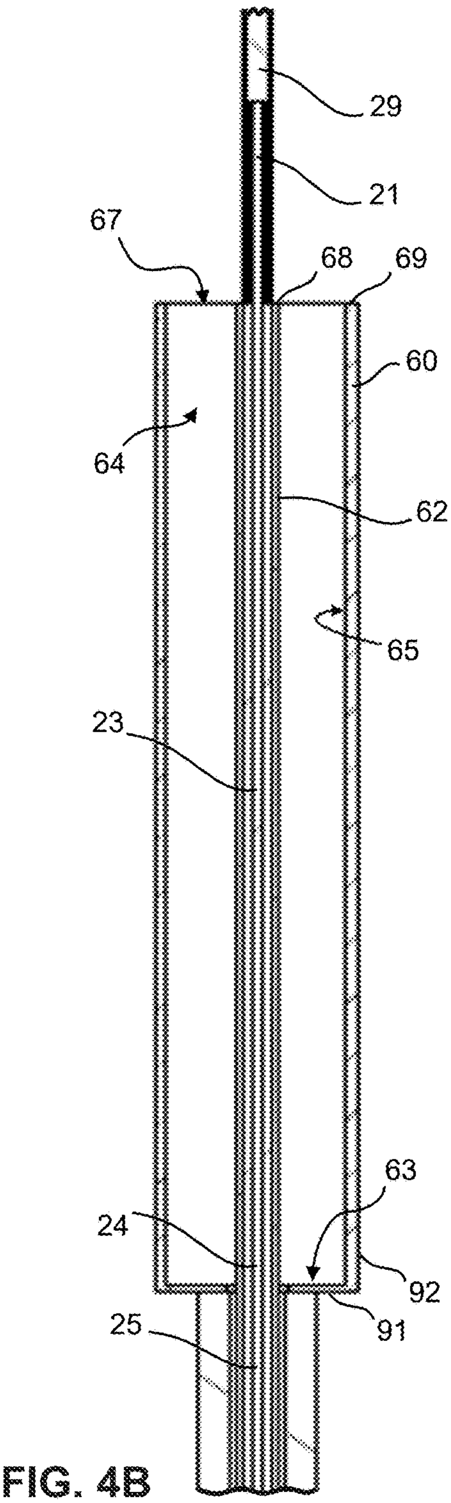
Figure 6:
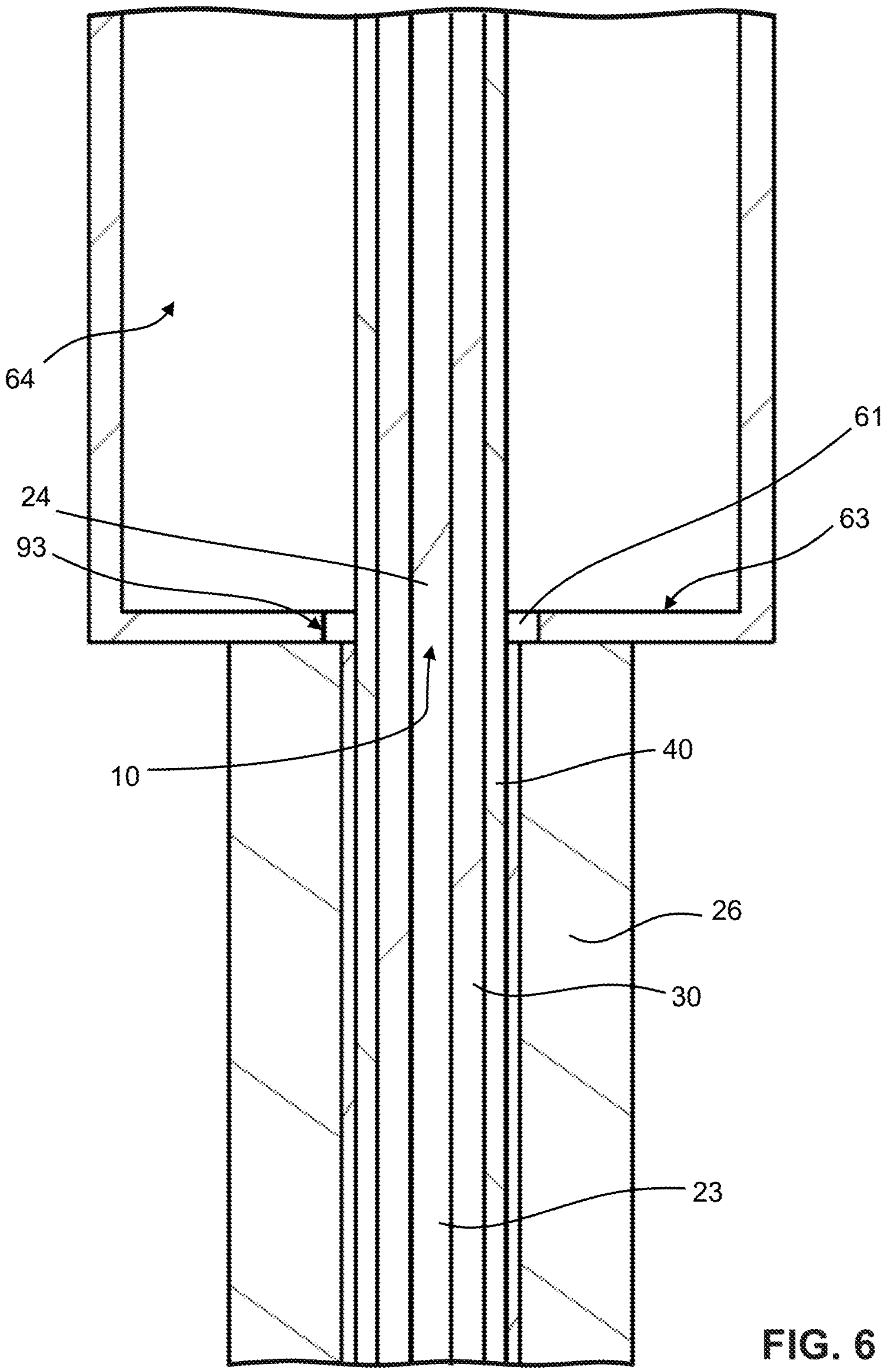
FIG. 6 illustrates a sectional view of portions of the monopole antenna depicted in FIG. 3A, including a balun connected to a shield at a contact location, in accordance with certain embodiments of the present disclosure.

In accordance with certain embodiments of the present disclosure, however, a balun is attached at or near a distal end of the second conductor or shield, as shown in FIG. 2A. As shown, an experiment was conducted using an E-Field scanner to measure the performance of a monopole antenna 1 with a balun attached at the proximate end of the monopole antenna 1. The attachment point is at position "AJ" on the horizontal axis of the grid 9 for the E-Field scanner. The balun extends to the left from position "AJ" to position "U" along the horizontal axis of the grid 9. Because the balun properly functioned, FIG. 2B shows a reduction in the radiation 4' of electromagnetic waves to the left of position "U" based on the results rendered from the conducted scan of the monopole antenna 1. As a result, the monopole antenna 1 efficiently transmits SLWs.

In contrast, referring back to FIG. 1B, radiation 4' is detected from the balun as represented in the area from position "AF" to position "U" along the horizontal axis of the E-Field scanner grid 9. Because the balun is radiating, the SLWs will be minimized or eliminated. Changing the balun attachment point to the presently disclosed location at or near a distal end of the second conductor is shield, as shown in FIG. 2A, unexpectedly solves this technical problem and results in a monopole antenna 1 capable of efficiently radiating SLWs. A person of ordinary skill in the art would appreciate that the presently disclosed attachment or contact location of the balun onto the shield is not an obvious matter of design choice, as demonstrated by a comparison of the test results shown in FIGS. 1B and 2B.

In order to generate SLWs and other such wave types, the divergence of the vector potential and the partial time derivative of the scalar potential must not cancel as they do with dipole antennas. Depending on its configuration and implementation, a monopole antenna may serve this purpose by reducing or eliminating the radiation of electromagnetic waves in a selective manner. Typically, a monopole antenna may be installed on an infinite ground plane, e.g. earth, and will not have an image current under the relevant conditions. For free hanging antennas, a skirt balun may be used as described in the above-referenced patent. The presently disclosed point of attachment for a balun, however, generated unexpected results based on measurements of balun performance conducted by the experiments disclosed herein.

In accordance with certain embodiments of the present disclosure, as shown in FIGS. 3A-3B, 4A-4B, 5A-5B, 6 and 7A-7B, a monopole antenna 1 may be arranged for generating, transmitting and receiving scalar longitudinal waves 2. The monopole antenna 1 may comprise a base end 10. In some embodiments, the monopole antenna 1 may comprise a core or center conductor 20 that may be made of copper or other conductive material. The center conductor 20 may comprise an antenna portion 21, a shielded portion 23, and a cable portion 25. The base end 10 of the monopole antenna 1 may be located at a proximal end 24 of the shielded portion 23. The center conductor 20 may comprise a tip end 22. The center conductor 20 may have a longitudinal axis 20' traversing an elongated length 20" of the center conductor 20. The center conductor 20 may extend toward the tip end 22 in a distal direction 20" parallel to the longitudinal axis 20'.

In certain embodiments, the monopole antenna 1 may comprise a solder infill 27 coupled to a side surface 28 of the antenna portion 21 of the center conductor 20. The side surface 28 may traverse at least a portion of the elongated length 20" of the center conductor 20. The monopole antenna 1 may further comprise an antenna tube 29 connected to the solder infill 27. In some embodiments, the antenna tube 29 may be made of copper or other conductive material. The antenna portion 21 may be encircled/wrapped, or surrounded in whole or in part, by the antenna tube 29.

In accordance with certain embodiments, the monopole antenna 1 may comprise a dielectric 30 coupled to the shielded portion 23 of the center conductor 20. In some embodiments, the dielectric 30 may be made of polyethylene (PE) or polytetrafluoroethylene (PTFE) such as Teflon™. The shielded portion 23 may be encircled by the dielectric 30. In certain embodiments, the monopole antenna 1 may comprise an outer conductor member or a shield 40 coupled to the dielectric 30. The shielded portion 23 may be encircled by the shield 40. In some embodiments, the shield 40 may comprise aluminum foil and/or a woven metallic braid made of copper or other conductive material.

In accordance with certain embodiments of the present disclosure, a balun 60 may be connected to the shield 40 at a contact location 61 on the shield 40. The contact location 61 may be located on an exterior surface 62 of the shield 40. The contact location 61 may comprise or correspond to the base end 10 along the longitudinal axis 20'. The balun 60 may extend from the base end 10 in the distal direction 20'". In certain embodiments, the monopole antenna 1 may comprise the balun 60. In some embodiments, the presently disclosed balun 60 may be configured and mounted on a preexisting monopole antenna 1 in a manner consistent with the disclosure provided herein.

In certain embodiments, the monopole antenna 1 may further comprise a gap 50 located between a first end 51 of the antenna portion 21 and a second end 52 of the shielded portion 23. The center conductor 20 may traverse, or pass through, the gap 50 from the second end 52 to the first end 51 in the distal direction 20". The dielectric 30 and the shield 40 may end or terminate at the second end 52 of the shielded portion 23. In some embodiments, the gap 50 may have/measure a distance 54 equal to 0.1 centimeters measured between the first end 51 and the second end 52 along the longitudinal axis 20'. The gap 50 may be located at a midway distance 55 between the base end 10 and the tip end 22 along the longitudinal axis 20'. The antenna portion 21 and the shielded portion 23 may have an equal length 56. The center conductor 20 may be configured to operate at an operating frequency, and the equal length 56 may be equivalent to a half of a wavelength corresponding to the operating frequency.

In accordance with certain embodiments, the balun 60 may form/have a cylindrical shell shape 60' that may have a closed end 63 located at the contact location 61. The cylindrical shell shape 60' of the balun 60 may form/define an elongated cavity 64 formed between the exterior surface 62 of the shield 40 and an interior surface 65 of the balun 60. The cylindrical shell shape 60' of the balun 60 may further have an open end 66 comprising an aperture 67 formed between a distal shield end 68 of the shield 40 and a distal balun end 69 of the balun 60. The center conductor 20 may extend through the aperture 67. In an embodiment, the distal shield end 68 may be aligned with the distal balun end 69. The shielded portion 23 and the balun 60 may have an equal length 56 along the longitudinal axis 20'. In some embodiments, a cylindrical shell diameter 60" of the cylindrical shell shape 60' may be equivalent to a half of a wavelength corresponding to an operating frequency, wherein the center conductor 20 is configured to operate at the operating frequency. In an embodiment, a cylindrical shell diameter 60" of the cylindrical shell shape 60' may be based on a core diameter 71 of the center conductor 20.

In some embodiments, the balun 60 may have a skirt shape or a substantively skirt-like shape. In an embodiment, the balun 60 may have a horn shape or a substantively horn-like shape. The balun 60 may have a sleeve shape or a substantively sleeve-like shape. In accordance with certain embodiments, the balun 60 may have a balun length 60" that may traverse, extend, stretch or run in the distal direction 20" parallel or substantively parallel to the longitudinal axis 20' of the center conductor 20. The shield 40 may have a shield length 40' that may traverse/extend in the distal direction 20" parallel or substantively parallel to the longitudinal axis 20' of the center conductor 20. In certain embodiments, the balun length 60'" and the shield length 40' are equal.

In an embodiment, the base end 10 may be adapted to connect to an antenna cable 74. A core conductor 78 of the antenna cable 74 may engage the center conductor 20. The outer conductor 79 of the antenna cable 74 may engage the shield 40. In accordance with certain embodiments of the present disclosure, the center conductor 20 comprises a cable portion 25. The cable portion 25 may be coupled to and encircled/wrapped by the dielectric 30 that may be coupled to and encircled by the shield 40. The cable portion 25 may be encircled or wrapped by a cable jacket 26. The cable jacket 26 may be coupled to the shield 40. The base end 10 may comprise a cable end 11 of the cable portion 25. An opposite end 72 of the cable portion 25 may comprise a cable connector 73. In some embodiment, the cable connector 73 may be adapted to engage an antenna cable 74. The cable connector 73 may comprise threads 75 adapted to engage corresponding threads 76 of the antenna cable 74.

In certain embodiments, the antenna cable 74 may be connected to a device 77 that may be adapted to transmit signals 3 to the monopole antenna 1. The monopole antenna 1 may be adapted to transmit scalar longitudinal waves 2 based on the signals 3, which may comprise a plurality of electrical impulses 3'. The device 77 may comprise a resonant spark system 77', and may be connected to a network. In accordance with certain embodiments, the antenna portion 21 of the center conductor 20 may radiate electromagnetic waves 4. The antenna portion 21 may comprise the solder infill 27 and the antenna tube 29, as a single unit. The balun 60 may reduce radiation 4' of the electromagnetic waves 4. The antenna portion 21 of the center conductor 20 may generate the scalar longitudinal waves 2 that may be transmitted by the monopole antenna 1. The scalar longitudinal waves 2 may be generated based on electrical impulses 3'.

In accordance with some embodiments, the balun 60 may comprise a first portion 91 that projects from the shield 40. The balun 60 may further comprise a second portion 92 extending from the first portion 91 in the distal direction 20" parallel or substantively parallel to the longitudinal axis 20' of the center conductor 20. The first portion 91 of the balun 60 may have a disc shape with a center point 93. The center point 93 may attach to the contact location 61 on the shield 40. In an embodiment, the second portion 92 of the balun 60 may form a cylindrical shell 60' around the shield 40. The first portion 91 may form a circular base or a substantially circular base at a proximate end of the cylindrical shell 60'. A distal end of the cylindrical shell 60' may form an aperture 67. The distal end of the cylindrical shell 60' may comprise the distal shield end 68 of the shield 40. The center conductor 20 may extend through the aperture 67. In an embodiment, the first portion 91 of the balun 60 may extend from the contact location 61 in a radial direction 94. The second portion 92 of the balun 60 may extend in the distal direction 20". The radial direction 94 may be perpendicular to the distal direction 20'" of the center conductor 20. The first and second portions 91/92 of the balun 60 may couple at a right angle.

Figure 7A:
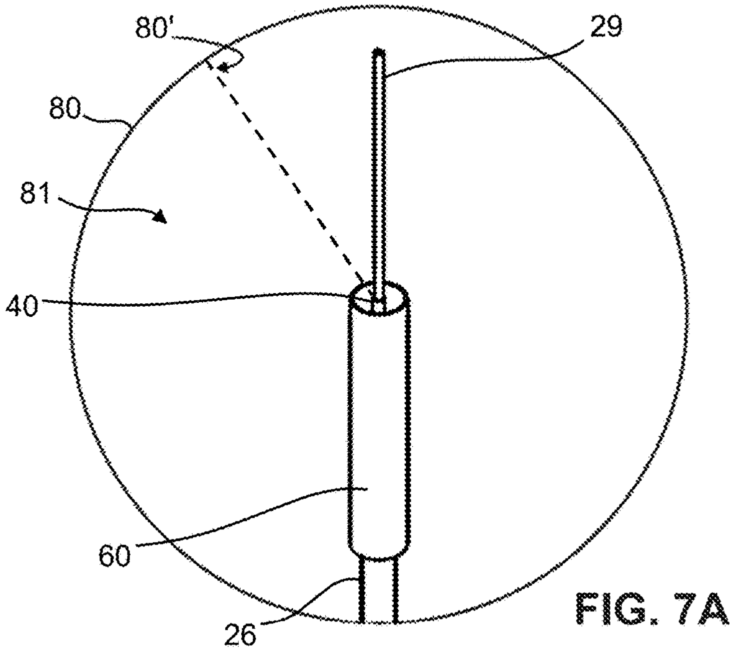
FIGS. 7A-7B illustrate sectional views of examples of a monopole antenna having a spherical transmitter, in accordance with certain embodiments of the present disclosure.
Figure 7B:
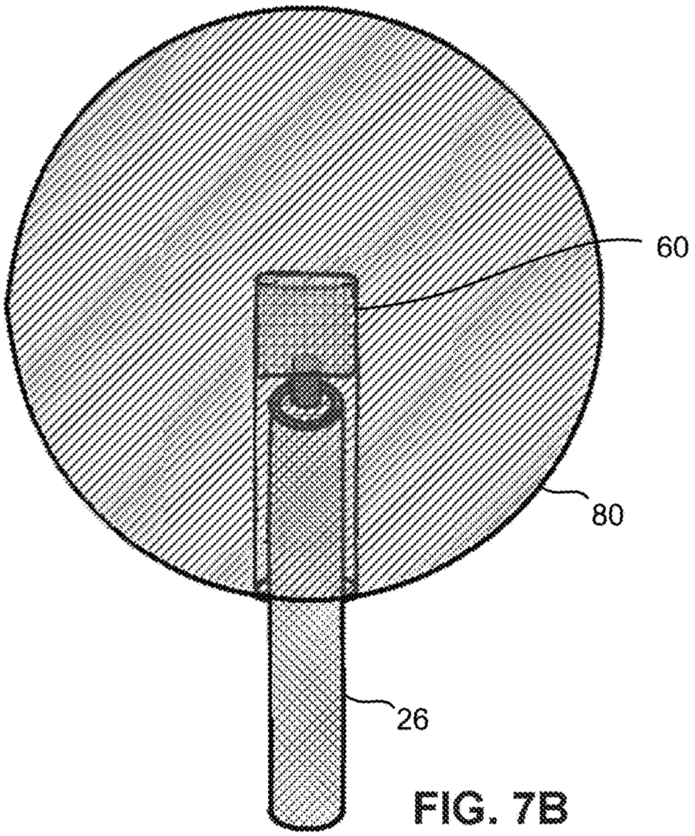

In accordance with some embodiments, as shown in FIGS. 7A-7B, the monopole antenna 1 may further comprise a spherical transmitter 80 enclosing the antenna portion 21 and the shielded portion 23 of the center conductor 20. The spherical transmitter 80 may comprise a sphere 80, which may be made of conductive materials such as various metallic elements and alloys that may include copper. The metallic sphere 80 may be substantially solid, and molded or adapted to connect to the balun 60. In some embodiments, the metallic sphere 80 may comprise an antenna cavity 81. The metallic sphere 80 may be connected to a cable jacket 26. A cable portion 25 of the center conductor 20 may be encircled/wrapped by the cable jacket 26. The spherical transmitter 80 may have a radius 80', and a balun length 60" equivalent to the radius 80'. The balun length 60" may be parallel to the longitudinal axis 20' of the center conductor 20. The radius 80' may be equivalent to a fourth of a wavelength corresponding to an operating frequency, wherein the center conductor 20 is configured to operate at the operating frequency. In an embodiment, the spherical transmitter 80 may comprise the antenna tube 29.

In some embodiments, the monopole antenna 1 may be mounted on a vehicle 1000 such as the vehicles disclosed in U.S. patent application Ser. No. 18/510,536 filed on Nov. 15, 2023. Such a vehicle may navigate through various mediums, including water, through which the scalar longitudinal waves 2 may be transmitted from the presently disclosed monopole antenna 1. The vehicles and mediums described in the aforementioned patent are incorporated herein by reference.

In accordance with certain embodiments of the present disclosure, a method 2000 for the operation of a monopole antenna 1 may include the step of connecting the base end 10 of the center conductor 20 to an antenna cable 74 [block 2001]. The antenna cable 74 may be connected to a device 77. The method 2000 may further include the steps of: generating, via the device 77, electrical impulses 3' [block 2002]; and, generating, via the monopole antenna 1, scalar longitudinal waves 2 based on the electrical impulses 3' [block 2003]. The scalar longitudinal waves 2 may be adapted to be transmitted through a conductive medium 5.

The conductive medium 5 may comprise water 5'. In some embodiments, the method 2000 may further include the step of receiving, via a second antenna 1, the scalar longitudinal waves 2 transmitted through the water 5' [block 2003]. In an embodiment, the monopole antenna 1 may be attached to a first vehicle 1000. The second antenna 1 may be attached to a second vehicle 1000. In some embodiments, the method 2000 may further comprise the step of communicating information from the first vehicle 1000 to the second vehicle 1000. The information may be based on the scalar longitudinal waves 2 transmitted through the water 5'.

Depending on the intended implementation and goals, the size and shape of a balun 60 may be based on the antenna cable 74 for the antenna 1. In an embodiment, a predetermined diameter 60" of the balun 60 may be relative to the cable 74. In some embodiments, when the balun 60 may be implemented within predetermined spatial limits, the free space between the balun 60 and the shield 40 may generate an optimal radiation field and/or optimize a characteristic of the antenna 1. In an embodiment, an increase in the balun diameter 60" may increase the performance of the antenna 1 and improve the generation, transmission and reception of SLWs 2.

Spark gap, or electrical impulse, based communication may be implemented in certain embodiments. The earliest radios used an electrical impulse that discharged a high voltage into a resonant circuit repeatedly. These circuits could be made to operate more quickly and efficiently using modern transistors. Use of these types of radios are banned under certain circumstances because the impulse has a theoretically infinite bandwidth that interferes with other spectrums. Some of the frequencies in the wide spectrum produced are more capable of penetrating sea water when driving the presently disclosed antennas. As electrical discharges in our atmosphere ionize air, in a vacuum, a sparkles static discharge propagates in all directions as electromagnetic broadband radiation without the need for an antenna. This radiation may be generated without the necessity of discharging to a nearby object. By using higher voltages and lower current, the vector potential may be reduced and the scalar potential may dominate. Utilizing an antenna 1 with a high voltage resonant spark system 77' may generate high-voltage low-current antenna feeds that are capable of generating SLW and scalar waves, while reducing the transverse electromagnetic (TEM) wave 4.

In accordance with some embodiments, utilizing one-wire capacitive coupling for transferring electrical power, experiment data demonstrated successfully transferring significant electrical power without a return line. By sloshing electrons between two capacitive bodies, the sloshed current may be rectified on the receiving side to recover a DC potential. Due to this oscillation accruing at higher frequencies, a capacitor may be positioned along the middle single wire, breaking the DC connection, and still recover the majority of the energy. It is easier to send a communication signal than it is to transfer power. As the latter was successfully demonstrated, communication may be established using the same technique between two metal bodies, e.g. two pressure vessels. With the earth acting as a 710-microfarad capacitor, like the aforementioned inline capacitor, an one-wire style communication may be established through the earth.

According to technical advantages for certain embodiments, coiled antennas having various asymmetric coil windings and coils on a sphere may generate vector and scalar fields that are not canceled when taking their derivative in respect to space or time. Symmetric coil windings, such a bifilar coil, may have SLW transmission advantages through cancelation of the E-Field. This may work similarly to a twisted pair, where wires in the spiral have neighboring wires when the current is moving in the opposite direction, and may cause the magnetic field of each wire to cancel with its opposing neighboring fields.

In accordance with certain embodiments, the circuitry for implementing the present disclosure, and calculating the classic electrodynamic equations and generating a plurality of electrical impulses 3' in order to generate SLWs 2, may include any combination of hardware, software, firmware, APIs, and/or other circuitry. The system circuitry may be implemented, for example, with one or more systems on a chip (SoC), servers, application specific integrated circuits (ASIC), field programmable gate arrays (FPGA), microprocessors, discrete analog and digital circuits, and other circuitry. The system circuitry may implement any desired functionality of the disclosed system. As just one example, the system circuitry may include one or more instruction processor and memory. The processor may be one or more devices operable to execute logic. The logic may include computer executable instructions or computer code embodied in the memory or in other memory that when executed by the processor, cause the processor to perform the features implemented by the logic. The computer code may include instructions executable with the processor. Logic, such as programs or circuitry, may be combined or split among multiple programs, distributed across several memories and processors, and may be implemented in a library, such as a shared library (e.g., a dynamic link library or DLL).

The memory stores, for example, control instructions for executing the features of the disclosed system. Examples of the memory may include non-volatile and/or volatile memory, such as a random access memory (RAM), a read-only memory (ROM), an erasable programmable read-only memory (EPROM), or flash memory. Alternatively, or in addition, the memory may include an optical, magnetic (hard drive) or any other form of data storage device. In one implementation, the processor executes the control instructions to carry out any desired functionality for the disclosed system. The control parameters may provide and specify configuration and operating options for the control instructions, and other functionality of the computer device. The computer device may further include various data sources, as described herein. Each of the databases that are included in the data sources may be accessed by the system to obtain data for consideration during any one or more of the processes described herein.

All of the discussion, regardless of the particular implementation described, is exemplary in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various modules and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

In some embodiments, the computer device may include communication interfaces, system circuitry, input/output (I/O) interface circuitry, and display circuitry. The communication interfaces may include wireless transmitters and receivers (herein, "transceivers") and any antennas used by the transmit-and-receive circuitry of the transceivers. The transceivers and antennas may support Wi-Fi network communications, for instance, under any version of IEEE 802.11, e.g., 802.11n or 802.11ac, or other wireless protocols such as Bluetooth, Wi-Fi, WLAN, cellular (4G, LTE/A). The communication interfaces may also include serial interfaces, such as universal serial bus (USB), serial ATA, IEEE 1394, lighting port, $I^2C$, slimBus, or other serial interfaces. The communication interfaces may also include wireline transceivers to support wired communication protocols. The wireline transceivers may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol.

While the present disclosure has been particularly shown and described with reference to an embodiment thereof, it will be understood by those skilled in the art that various changes in form and details may be made therein without departing from the spirit and scope of the present disclosure. Although some of the drawings illustrate a number of operations in a particular order, operations that are not order-dependent may be reordered and other operations may be combined or broken out. While some reordering or other groupings are specifically mentioned, others will be apparent to those of ordinary skill in the art and so do not present an exhaustive list of alternatives. The presently disclosed instructions and code are examples, which may vary as understood by those skilled in the art, that are listed in order to illustrate the nature of certain embodiments.

What is claimed is:

1. A monopole antenna for transmitting scalar longitudinal waves, comprising:
- a base end;
- a center conductor comprising an antenna portion and a shielded portion, the base end of the monopole antenna located at a proximal end of the shielded portion, the center conductor comprising a tip end, the center conductor having a longitudinal axis traversing an elongated length of the center conductor, the center conductor extending toward the tip end in a distal direction parallel to the longitudinal axis;
- a solder infill coupled to a side surface of the antenna portion of the center conductor, the side surface traversing at least a portion of the elongated length of the center conductor;
- an antenna tube connected to the solder infill, wherein the antenna portion is encircled by the antenna tube;
- a dielectric coupled to the shielded portion of the center conductor, wherein the shielded portion is encircled by the dielectric;
- a shield coupled to the dielectric, wherein the shielded portion is encircled by the shield; and,
- a balun connected to the shield at a contact location on the shield, wherein the contact location is located on an exterior surface of the shield, wherein the contact location corresponds to the base end along the longitudinal axis, wherein the balun extends from the base end in the distal direction.

2. The monopole antenna of claim 1, further comprising:
- a gap located between a first end of the antenna portion and a second end of the shielded portion, the center conductor passing through the gap from the second end to the first end in the distal direction, wherein the dielectric and the shield terminate at the second end of the shielded portion.

3. The monopole antenna of claim 2, wherein the gap measures a distance equal to 0.1 centimeters measured between the first end and the second end along the longitudinal axis.

4. The monopole antenna of claim 2, wherein the gap is located at a midway distance between the base end and the tip end along the longitudinal axis, wherein the antenna portion and the shielded portion have an equal length.

5. The monopole antenna of claim 4, wherein the equal length is equivalent to a half of a wavelength corresponding to an operating frequency, wherein the center conductor is configured to operate at the operating frequency.

6. The monopole antenna of claim 1, wherein the balun has a cylindrical shell shape having a closed end located at the contact location, wherein the cylindrical shell shape of the balun defines an elongated cavity formed between the exterior surface of the shield and an interior surface of the balun, the cylindrical shell shape of the balun further having an open end comprising an aperture formed between a distal shield end of the shield and a distal balun end of the balun, wherein the center conductor extends through the aperture.

7. The monopole antenna of claim 6, wherein the distal shield end is aligned with the distal balun end, wherein the shielded portion and the balun have an equal length along the longitudinal axis.

8. The monopole antenna of claim 6, wherein a cylindrical shell diameter of the cylindrical shell shape is equivalent to a half of a wavelength corresponding to an operating frequency, wherein the center conductor is configured to operate at the operating frequency.

9. The monopole antenna of claim 6, wherein a cylindrical shell diameter of the cylindrical shell shape is based on a core diameter of the center conductor.

10. The monopole antenna of claim 1, further comprising:
- a spherical transmitter enclosing the antenna portion and the shielded portion of the center conductor.

11. The monopole antenna of claim 10, wherein the spherical transmitter comprises a metallic sphere.

12. The monopole antenna of claim 10, wherein the spherical transmitter is substantially solid, the spherical transmitter adapted to connect to the balun.

13. The monopole antenna of claim 10, wherein the spherical transmitter comprises an antenna cavity.

14. The monopole antenna of claim 10, wherein the spherical transmitter is connected to a cable jacket, wherein the cable jacket encircles a cable portion of the center conductor.

15. The monopole antenna of claim 10, wherein the spherical transmitter comprises the antenna tube.

16. The monopole antenna of claim 10, wherein the spherical transmitter has a radius, wherein the balun has a balun length equivalent to the radius of the spherical transmitter, wherein the balun length is parallel to the longitudinal axis of the center conductor.

17. The monopole antenna of claim 15, wherein the radius is equivalent to a fourth of a wavelength corresponding to an operating frequency, wherein the center conductor is configured to operate at the operating frequency.

18. The monopole antenna of claim 1, wherein the balun has a shape selected from a group consisting of: a skirt shape, a substantively skirt-like shape, a horn shape, a substantively horn-like shape, a sleeve shape, and a substantively sleeve-like shape.

19. The monopole antenna of claim 1, wherein the balun has a balun length traversing in the distal direction parallel or substantively parallel to the longitudinal axis of the center conductor, wherein the shield has a shield length traversing in the distal direction parallel or substantively parallel to the longitudinal axis of the center conductor.

20. The monopole antenna of claim 1, wherein the balun length and the shield length are equal.

21. The monopole antenna of claim 1, wherein the balun comprises a first portion that projects from the shield, wherein the balun further comprises a second portion extending from the first portion in the distal direction parallel or substantively parallel to the longitudinal axis of the center conductor.

22. The monopole antenna of claim 21, wherein the first portion of the balun has a disc shape with a center point, wherein the center point attaches to the contact location on the shield.

23. The monopole antenna of claim 22, wherein the second portion of the balun forms a cylindrical shell around the shield, wherein the first portion forms a circular base or a substantially circular base at a proximate end of the cylindrical shell, wherein a distal end of the cylindrical shell forms an aperture, wherein the distal end of the cylindrical shell comprises the distal shield end of the shield, wherein the center conductor extends through the aperture.

24. The monopole antenna of claim 21, wherein the first portion of the balun extends from the contact location in a radial direction, wherein the radial direction is perpendicular to the distal direction of the center conductor.

25. The monopole antenna of claim 24, wherein the first and second portions of the balun couple at a right angle.

26. The monopole antenna of claim 1, wherein the base end is adapted to connect to an antenna cable, wherein a core conductor of the antenna cable engages the center conductor, and wherein outer conductor of the antenna cable engages the shield.

27. The monopole antenna of claim 1, wherein the center conductor further comprises a cable portion, the cable portion coupled to and encircled by the dielectric that is coupled to and encircled by the shield, wherein the cable portion is encircled by a cable jacket, the cable jacket coupled to the shield, wherein the base end comprises a cable end of the cable portion, wherein an opposite end of the cable portion comprises a cable connector.

28. The monopole antenna of claim 27, wherein the cable connector is adapted to engage an antenna cable, wherein the cable connector comprises threads adapted to engage corresponding threads of the antenna cable.

29. The monopole antenna of claim 26 or 28, wherein the antenna cable is connected to a device, wherein the device is adapted to transmit signals to the monopole antenna.

30. The monopole antenna of claim 29, wherein the monopole antenna is adapted to transmit the scalar longitudinal waves based on the signals, the signals comprising a plurality of electrical impulses, wherein the device comprises a resonant spark system.

31. The monopole antenna of claim 30, wherein the antenna portion of the center conductor radiates electromagnetic waves, wherein the antenna portion comprises the solder infill and the antenna tube, wherein the balun reduces a radiation of the electromagnetic waves, wherein the antenna portion of the center conductor generates the scalar longitudinal waves transmitted by the monopole antenna, wherein scalar longitudinal waves are generated based on the electrical impulses.

32. The monopole antenna of claim 1, wherein the monopole antenna 1 is adapted to be mounted on a vehicle.

33. A method for using a monopole antenna of claim 1, comprising the steps of:

connecting the base end of the center conductor to an antenna cable, wherein the antenna cable is connected to a device;

generating, via the device, electrical impulses; and, generating, via the monopole antenna, scalar longitudinal waves based on the electrical impulses, wherein the scalar longitudinal waves are adapted to be transmitted through a conductive medium, the conductive medium comprising water.

34. The method of claim 33, further comprising the step of:

receiving, via a second antenna, the scalar longitudinal waves transmitted through the water.

35. The method of claim 34, wherein the monopole antenna is attached to a first vehicle, wherein the second antenna is attached to a second vehicle.

36. The method of claim 35, further comprising the step of:

communicating information from the first vehicle to the second vehicle, wherein the information is based on the scalar longitudinal waves transmitted through the water.

* * * * *